(12) United States Patent
Xue

(10) Patent No.: US 11,900,568 B2
(45) Date of Patent: Feb. 13, 2024

(54) WRITING TRAJECTORY PROCESSING METHOD, TOUCH CONTROL DEVICE, WRITING SYSTEM AND STORAGE MEDIUM

(71) Applicant: BOE Technology Group Co., Ltd., Beijing (CN)

(72) Inventor: Ruibin Xue, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 113 days.

(21) Appl. No.: 17/421,392

(22) PCT Filed: Sep. 29, 2020

(86) PCT No.: PCT/CN2020/119096
§ 371 (c)(1),
(2) Date: Jul. 8, 2021

(87) PCT Pub. No.: WO2022/067585
PCT Pub. Date: Apr. 7, 2022

(65) Prior Publication Data
US 2022/0358624 A1 Nov. 10, 2022

(51) Int. Cl.
*G06T 5/00* (2006.01)
*G06T 3/40* (2006.01)
*G06T 11/20* (2006.01)

(52) U.S. Cl.
CPC ............. *G06T 5/002* (2013.01); *G06T 3/40* (2013.01); *G06T 11/203* (2013.01)

(58) Field of Classification Search
None
See application file for complete search history.

(56) References Cited

U.S. PATENT DOCUMENTS 6,268,865 B1 * 7/2001 Daniels ................. G06T 11/001
345/582
6,559,858 B1   5/2003 Schneider et al.
(Continued)

FOREIGN PATENT DOCUMENTS

CN   105225260 A   1/2016
CN   106293232 A   1/2017
(Continued)

*Primary Examiner* — Jeffrey J Chow
(74) *Attorney, Agent, or Firm* — Ling Wu; Stephen Yang; Ling and Yang Intellectual Property

(57) ABSTRACT

Provided are a writing trajectory processing method, a touch control device, a writing system and a storage medium. The writing trajectory processing method includes: obtaining writing data of an original writing trajectory, wherein the writing data comprise a plurality of first trajectory points and a plurality of first contact areas corresponding to the plurality of first trajectory points one to one; smoothing the writing data to obtain smoothed writing data; wherein the smoothed writing data comprise a plurality of second trajectory points and a plurality of second contact areas corresponding to the plurality of second trajectory points one to one; determining a plurality of trajectory line widths corresponding to the plurality of second trajectory points one to one based on the plurality of second contact areas; and, displaying the writing trajectory based on the plurality of second trajectory points and the plurality of trajectory line widths.

11 Claims, 3 Drawing Sheets

(56) References Cited

U.S. PATENT DOCUMENTS

| | | | | |
|---|---|---|---|---|
| 9,207,858 | B2* | 12/2015 | Antonyuk | G06V 30/1423 |
| 2003/0025675 | A1* | 2/2003 | Dresevic | G06T 11/203 |
| | | | | 345/173 |
| 2011/0199297 | A1* | 8/2011 | Antonyuk | G06F 3/04883 |
| | | | | 345/157 |
| 2011/0298807 | A1* | 12/2011 | Kim | G06F 3/04883 |
| | | | | 345/442 |
| 2012/0223949 | A1* | 9/2012 | Whited | G06V 30/347 |
| | | | | 345/441 |
| 2014/0015811 | A1* | 1/2014 | Ji | G06F 3/04883 |
| | | | | 345/179 |
| 2014/0043342 | A1* | 2/2014 | Goel | G06T 9/00 |
| | | | | 345/501 |
| 2016/0179365 | A1* | 6/2016 | Angelov | G06F 3/04812 |
| | | | | 345/179 |
| 2017/0046041 | A1* | 2/2017 | Lee | G06F 3/0383 |
| 2017/0090672 | A1* | 3/2017 | Tennant | G06F 3/0418 |
| 2017/0236021 | A1* | 8/2017 | Petkov | G06V 30/2268 |
| | | | | 345/179 |
| 2019/0073808 | A1 | 3/2019 | Kagawa | |
| 2019/0317616 | A1* | 10/2019 | Angelov | G06F 3/03545 |
| 2020/0387301 | A1* | 12/2020 | Yuk | G06F 3/04883 |

FOREIGN PATENT DOCUMENTS

| | | |
|---|---|---|
| CN | 106547433 A | 3/2017 |
| CN | 107219941 A | 9/2017 |
| CN | 107798717 A | 3/2018 |
| JP | 2004-240380 A | 8/2004 |

\* cited by examiner

WRITING TRAJECTORY PROCESSING METHOD, TOUCH CONTROL DEVICE, WRITING SYSTEM AND STORAGE MEDIUM

CROSS-REFERENCE TO RELATED APPLICATION

The present application is a U.S. National Phase Entry of International Application No. PCT/CN2020/119096 having an international filing date of Sep. 29, 2020, the entire content of which is hereby incorporated by reference.

TECHNICAL FIELD

Embodiments of the disclosure relate to, but are not limited to, the technical field of handwriting display, in particular to a writing trajectory processing method, a touch control device, a writing system and a storage medium.

BACKGROUND

With the rapid development of information technology, touch control devices (such as electronic interactive whiteboard), being a convenient tool, play a significant role in the interaction and sharing of information in the fields of intelligent education, business office and intelligent medical care.

Nowadays, with the technological progress of touch control devices, writing functions gradually attract increasing attentions, and users have higher demands for writing experience. On the basis that writing trajectory can be accurately identified, poor processing effect of the writing trajectory hinders users from obtaining a pleasant writing experience.

SUMMARY

The following is a summary of subject matter described in detail herein. This summary is not intended to limit the protection scope of the claims.

In a first aspect, embodiments of the present disclosure provide a writing trajectory processing method, including: obtaining writing data of an original writing trajectory, wherein the writing data comprise a plurality of first trajectory points and a plurality of first contact areas corresponding to the plurality of first trajectory points one to one; smoothing the writing data to obtain smoothed writing data; wherein the smoothed writing data comprise a plurality of second trajectory points and a plurality of second contact areas corresponding to the plurality of second trajectory points one to one; determining a plurality of trajectory line widths corresponding to the plurality of second trajectory points one to one based on the plurality of second contact areas; and, displaying the writing trajectory based on the plurality of second trajectory points and the plurality of trajectory line widths.

In a second aspect, embodiments of the present disclosure further provides a touch control device, which includes a processor and a memory storing a computer program that can be run on the processor, wherein steps of the above mentioned writing trajectory processing method are implemented when the processor executes the program.

In a third aspect, embodiments of the present disclosure further provide a writing system, which includes a stylus for writing calligraphy fonts and the aforementioned touch control device.

In a fourth aspect, embodiments of the present disclosure further provide a computer readable storage medium, which includes a stored program, and the touch control device where the storage medium is located is controlled to execute steps of the above mentioned writing trajectory processing method when the program is run.

Of course, it is not necessary to achieve all of the advantages mentioned above to implement any one product or method of the present disclosure. Other features and advantages of the present disclosure will be set forth in the following description, and in part will become apparent from the description, or be learned by practice of the embodiments of the present disclosure. Other advantages of the present disclosure may be realized and obtained by the solutions described in the specification and drawings.

Other aspects will become apparent upon reading and understanding accompanying drawings and the detailed description.

BRIEF DESCRIPTION OF DRAWINGS

Accompanying drawings are used to provide a further understanding of technical solutions of the present disclosure, and constitute a part of the specification. Together with embodiments of the present disclosure, they are used to explain the technical solutions of the present disclosure, and do not constitute a limitation on the technical solutions of the present disclosure. Shapes and sizes of the components in the drawings do not reflect true proportions and only to be used to schematically illustrate contents of the present disclosure.

DETAILED DESCRIPTION

Figure 1:
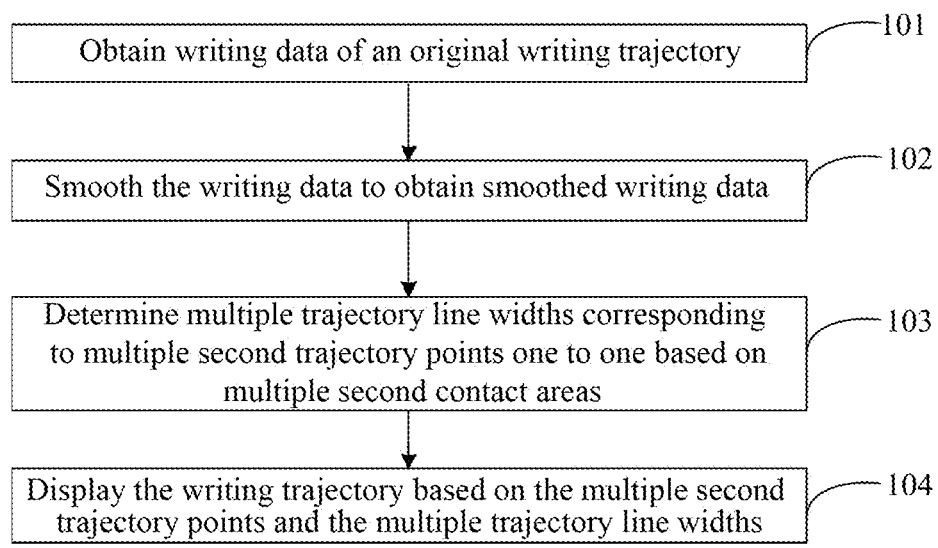
FIG. 1 is a schematic flowchart of a writing trajectory processing method according to an embodiment of the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the Detailed Description, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of steps. However, to the extent that the method or process does not depend on the specific order of steps described herein, the method or process should not be limited to the specific order of steps described. As those of ordinary skills in the art will understand, other orders of steps are also possible. Therefore, the specific order of steps set forth in the specification should not be interpreted as limiting the claims. In addition, the claims for the method and/or process should not be limited to performing their steps in the written order, and those of skilled in the art may readily understand that these orders may vary and still remain within the spirit and scope of the embodiments of the present disclosure.

Unless otherwise defined, technical terms or scientific terms used in the embodiments shall have common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "containing" mean that elements or articles appearing before the word cover elements or articles listed after the word and their equivalents, without excluding other elements or articles. Similar words such as "connect" or "link" are not limited to physical or mechanical connections, but may include electrical connections, whether direct or indirect.

The following will clearly and completely describe the technical solution of the embodiments of the present invention with reference to the drawings of the embodiments of the present disclosure.

Embodiments of the present disclosure provide a writing trajectory processing method. In practice, this writing trajectory process can be applied to touch control devices.

In an exemplary embodiment, the touch control device can be an electronic device with touch control function such as an electronic interactive whiteboard (e.g., a conference whiteboard, a teaching whiteboard, etc.), a tablet computer, a smart phone, a laptop computer, an electronic blackboard newspaper, an electronic signature wall, etc. In practice, users can write on the working surface (e.g., touch screen) of the touch control device with a stylus (e.g., active stylus, passive stylus, sponge pen, etc.). The touch control device can not only receive the original writing trajectory formed on the working surface when the user writes, but also display corresponding information based on the original writing trajectory.

In an exemplary embodiment, the touch control device may be an infrared touch control device.

FIG. 1 is a schematic flowchart of a writing trajectory processing method according to an embodiment of the present disclosure. As shown in FIG. 1, the writing trajectory processing method may include the following steps.

In step 101, obtain the writing data of the original writing trajectory.

The writing data include multiple first trajectory points and multiple first contact areas corresponding to the multiple first trajectory points one to one.

In step 102, smooth the writing data to obtain smoothed writing data.

The smoothed writing data include multiple second trajectory points and multiple second contact areas corresponding to the multiple second trajectory points one to one.

In step 103, determine multiple trajectory line widths corresponding to multiple second trajectory points one to one based on multiple second contact areas.

In step 104, display the writing trajectory based on multiple second trajectory points and multiple trajectory line widths.

In this way, by smoothing the writing data to obtain smoothed trajectory points and contact areas, determining the trajectory line width according to the smoothed contact areas, and then displaying the writing trajectory through the smoothed trajectory points and the trajectory line widths corresponding to the smoothed trajectory points, the jagged and burr appearance of the writing trajectory can be eliminated, and the displayed writing trajectory can be smooth, full and natural, which improves the display effect of the writing trajectory and then improves users' writing experience.

In practice, the aforementioned writing trajectory processing method can be applied to various situations requiring handwriting input on touch control devices. For example, when taking an example where the touch control device being a airport electronic signature wall, the above writing trajectory processing method can provide an interesting interactive way for the airport electronic signature wall, process the signatures of passengers, and give a more textured presentation. When taking an example where the touch control device being an electronic interactive whiteboard, the above writing trajectory processing method can provide a new blackboard newspaper manner for smart classrooms and process the blackboard writing and blackboard newspaper fonts of students or teachers for a clearer presentation.

Each of the steps is illustrated with an example in the following.

First, Step 101 will be described.

In an exemplary embodiment, the writing data of the original writing trajectory acquired in step 101 may include the writing data of one stroke or the writing data of multiple strokes. Embodiments of the present disclosure are not limited here.

In an exemplary embodiment, the touch control device can sample the original writing trajectory input by users on the working surface of the touch control device according to a preset sampling time, in this way, the first trajectory point and the first contact area corresponding to the original writing trajectory can be obtained. For example, a sparse sampling method of the original writing trajectory may be adopted to obtain multiple first trajectory points and multiple first contact areas corresponding to the first trajectory points, and the quantity of the first trajectory points can be determined according to the actual situation.

In an exemplary embodiment, Step 101 may include:

Step 1011: During the user's input of the original writing trajectory, obtain multiple first trajectory points through the interface for obtaining the coordinates of touch events, and obtain multiple touch elliptical region parameters corresponding to the multiple first trajectory points one to one through the interface for obtaining the touch elliptical region parameters of touch events, wherein each touch elliptical region parameter includes length of a long axis and length of a short axis.

Step 1012: Calculate multiple first contact areas based on multiple touch elliptical region parameters.

For example, taking the Android system as an example, the interface for obtaining the coordinates of a touch event may include: a getX ( ) interface for obtaining the abscissa (X-axis) and a getY ( ) interface for obtaining the ordinate (Y-axis); and the interface for obtaining the parameters of the touch ellipse region of the touch event may include: a getTouchMajor ( ) interface for obtaining the length of the long axis of the pressed ellipse region and getTouchMinor ( ) interface for obtaining the length of the short axis of the pressed ellipse region.

After obtaining the lengths of the long axis and short axis of each elliptical region in step 1012, the area of each elliptical region can be calculated by the following formula (1), and thereby, the first contact area can be calculated.

$$S=\pi ab/4 \quad \text{Formula (1)}$$

In Formula (1), S is the area of the elliptical region (i.e., the first contact area), a is the long axis length, b is the short axis length and $\pi$ is the circular constant (Pi).

In an exemplary embodiment, the original writing trajectory may include, but is not limited to, regular script font, running script font, cursive script font, official script font, seal script font and other calligraphy fonts of various styles.

In an exemplary embodiment, the original writing trajectory may be a soft pen calligraphy font (such as a brush font).

In an exemplary embodiment, taking that the original writing trajectory is a calligraphy font as an example, Step 101 may include:

Step 1013: Obtain the writing data when the user inputs the original writing trajectory on the touch control device through the stylus for writing calligraphy fonts. In this way, after the writing data are obtained, the displayed writing trajectory gains more texture through step 104, which enriches the expression of writing handwriting and the users' perceptual intuition of the writing trajectory, and further improves the users' writing experience with the stylus for calligraphy fonts.

In an exemplary embodiment, taking that the original writing trajectory is a soft pen calligraphy font (such as a brush font) as an example, if the touch control device is an infrared touch control device, the stylus for writing calligraphy fonts may be a sponge pen. In this way, when the original writing trajectory is a soft pen calligraphy font (such as a brush font), after the writing data are obtained, the displayed writing trajectory having a beautiful stroke effect is achieved through step 104, so that the writing trajectory gains more texture, the expression of handwriting is enriched, the users' perceptual intuition of the writing trajectory is improved, and the users' writing experience with a sponge pen is improved greatly.

Next, Step 102 will be described.

In an exemplary embodiment, Step 102 may include:

Step 1021: Carry out smooth processing through a Bezier curve based on multiple first trajectory points to obtain multiple second trajectory points.

Step 1022: Smooth multiple first contact areas through Bezier curve to obtain multiple second contact areas.

In an exemplary embodiment, the Bezier curve may be a second-order Bezier curve or a third-order Bezier curve.

For example, the second-order Bezier curve can be expressed by the following formula (2).

$$B(t)=(1-t)^2 P_0+2t(1-t)P_1+t^2 P_2, t\in[0,1] \quad \text{Formula (2)}$$

In formula (2), B(t) is the second trajectory point, $P_0$ is the starting point parameter of Bezier curve, $P_2$ is the end point parameter of Bezier curve, $P_1$ is the control point parameter of Bezier curve, and t is a variable.

After being smoothed through the Bezier curve, the second trajectory points may include not only the first trajectory points (possibly part or all), but also interpolation points. Here, the interpolation point refers to the point obtained by smoothing the first trajectory point with Bezier curve, which can make the subsequent displayed writing trajectory smoother and better looking. The quantity of interpolation points in the second trajectory point may be determined according to the actual situation.

In an exemplary embodiment, Step 1021 may include:

Step 10211: Calculate the midpoint of every two adjacent first trajectory points.

Step 10212: Smooth a point sequence consisting of multiple first trajectory points and the midpoint of every two adjacent first trajectory points by Bezier curve to obtain multiple second trajectory points.

Next, the Bezier curve being the second-order Bezier curve will be taken as an example to illustrate how to get the second trajectory point. In practice, according to the different parameters of the Bezier curve (including: starting point parameters, control point parameters, and end point parameters), step 10212 may have, but is not limited to, the following two implementations:

Implementation 1: the original writing trajectory may include a starting part and other parts except the starting part, and the parameters of Bezier curve are set in different ways for the trajectory points corresponding to the starting part and the trajectory points corresponding to the other parts.

In an exemplary embodiment, taking that the control point and the end point are the same when smoothing the starting part with a second-order Bezier curve as an example, Step 10212 may include: taking the first one of the first trajectory points as the starting point parameter, the midpoint between the first one and second one of the first trajectory points as the control point parameter, and the midpoint between the first one and second one of the first trajectory points as the end point parameter of the Bezier curve, and using the Bezier curve formula shown in formula (2) to calculate to obtain partial points in the second trajectory points; sequentially taking the midpoint of the i-th one of the first trajectory points and the (i+1)-th one of the first trajectory points as the starting point parameter, the (i+1)-th one of the first trajectory points as the control point parameter, and the midpoint of the (i+1)-th one of the first trajectory points and the (i+2)-th one of the first trajectory points as the end point parameter of the Bezier curve, and using the Bezier curve formula shown in formula (2) to calculate to obtain other points except the partial points in the second trajectory points, where i is a positive integer greater than or equal to 1.

Figure 2:
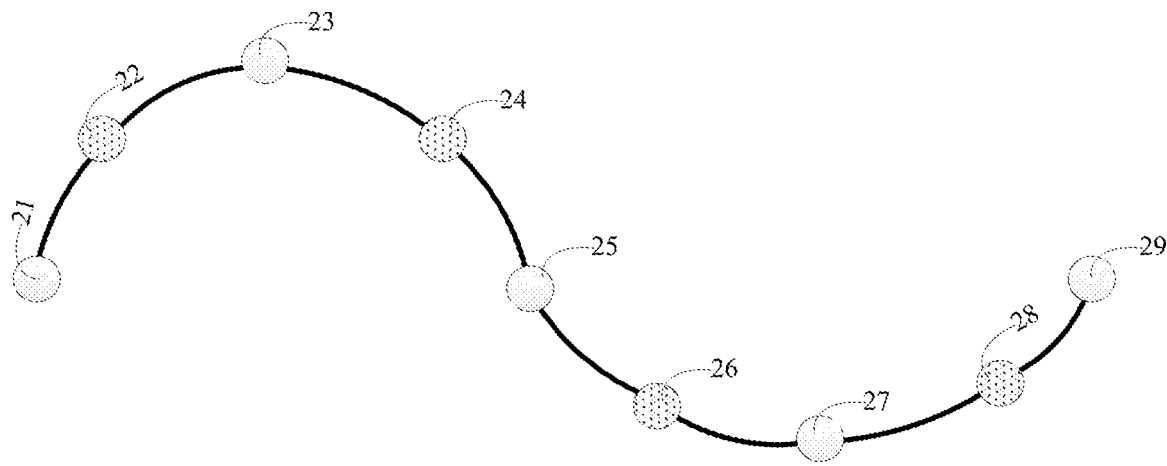
FIG. 2 is a schematic diagram of an original writing trajectory according to an embodiment of the present disclosure.

For example, taking the original writing trajectory as shown in FIG. 2 as an example, the original writing trajectory may include: point 21 being the first one of the first trajectory points, point 23 being the second one of the first trajectory points, point 25 being the third one of the first trajectory points, point 27 being the fourth one of the first trajectory points and point 29 being the fifth one of the first trajectory points. Herein, the midpoint between the first one of the first trajectory points and the second one of the first trajectory points is point 22, the midpoint between the second one of the first trajectory points and the third one of the first trajectory points is point 24, the midpoint between the third one of the first trajectory points and the fourth one of the first trajectory points is point 26, the midpoint between the fourth one of the first trajectory points and the fifth one of the first trajectory points is point 28. Then, the process of smoothing the original writing trajectory through the Implementation 1 may include: first, smoothing points 21 and 22 through the Bezier curve (where point 21 is the starting point parameter of the Bezier curve, and point 22 is both the end point parameter and the control point parameter), next smoothing points 22, 23, and 24 through the Bezier curve, and then smoothing points 24, 25, and 26 through the Bezier curve and so on, until the point sequences corresponding to the original writing trajectories are completely smoothed and the required second trajectory points are calculated through the Bezier curve.

Implementation 2: the original writing trajectory may include a starting part and the other part except the starting part, and the parameters of Bezier curve are set in a same way for the trajectory points corresponding to the starting part and the trajectory points corresponding to the other part.

In an exemplary embodiment, Step 10212 may include: sequentially taking a j-th one of the first trajectory points as the starting point parameter of the Bezier curve, the midpoint of the j-th one and the (j+1)-th one of the first trajectory points as the control point parameter of the Bezier curve, and the (j+1)-th one of the first trajectory points as the end point parameter of the Bezier curve to calculate the second trajectory point, where j is a positive integer greater than or equal to 1.

For another example, taking the original writing trajectory as shown in FIG. 2 as an example, the smoothing process of the original writing trajectory through Implementation 2 may include: first, smoothing points 21, 22, and 23 through the Bezier curve, next smoothing points 23, 24, and 25 through the Bezier curve, and then smoothing points 25, 26, and 27 through the Bezier curve and so on, until the point sequences corresponding to the original writing trajectories are smoothed completely and the required second trajectory points are calculated through the Bezier curve.

Next, Step 103 will be described.

In an exemplary embodiment, Step 103 may include:

Step 1031: Scale multiple second contact areas with a preset scaling factor to obtain multiple trajectory line widths. In this way, the multiple second contact areas are scaled with a preset scaling factor to convert the contact area between the stylus and the touch screen of the touch control device into the trajectory line width corresponding to the original handwriting. Compared with the method of calculating the line width through a model, the above calculation method can accurately and efficiently determine the trajectory line width and has the advantages of small calculation amount and fast processing speed.

In an exemplary embodiment, scaling the multiple second contact areas may be one or more of a zoom-out process and a zoom-in process.

In practice, according to the different preset scaling factors, Step 1031 may have, but is not limited to the following implementations.

In an exemplary embodiment, taking as an example that the preset scaling coefficients include a preset first coefficient and a preset second coefficient, Step 1031 may include:

Step 10311: Scale multiple second contact areas by a preset first coefficient to obtain multiple processed second contact areas.

Step 10312: Scale multiple processed second contact areas by a preset second coefficient to obtain multiple trajectory line widths.

In this way, the contact area is firstly scaled based on the preset first coefficient, and then scaled based on the preset second coefficient to convert the contact area between the stylus and the touch control screen of the touch control device into the trajectory line width corresponding to the original handwriting. Compared with the method of calculating the line width through a model, the above calculation method can accurately and efficiently determine the trajectory line width.

For example, taking as an example that the user writes on the touch control device with a stylus (such as a sponge pen), and the touch control device executes Step 102 to calculate the second contact area, the following formula (3) can be used to convert the contact area of the stylus and the touch control screen of the touch control device into the trajectory line width corresponding to the original handwriting.

$$S_a'=k_2*S_a/k_1 \qquad \text{Formula (3)}$$

In formula (3), $S_a$ is the second contact area, $S_a'$ is the trajectory line width, $k_1$ is the preset first coefficient and $k_2$ is the preset second coefficient are expressed.

In an exemplary embodiment $k_1 \in (0, 1000) \in N$, where N is a set of natural numbers.

In an exemplary embodiment, $k_2 \in (0, 10) \in N$, where N is a set of natural numbers.

In an exemplary embodiment, the value range of the scaling factor can be set as: $k_1 \in (0, 1000) \in N$, and $k_2 \in (0, 10) \in N$. In this way, the contact area is firstly zoomed out based on the preset first coefficient, and then zoomed in based on the preset second coefficient to convert the contact area between the stylus and the touch control screen of the touch control device into the trajectory line width corresponding to the original handwriting. The trajectory line width can be accurately determined, and furthermore, the writing trajectory can be displayed based on the trajectory line width, which can further improve the effect of the writing trajectory.

Of course, the quantity and range of preset scaling coefficients can also be anything in addition to the quantity and range of preset scaling coefficients listed above, which is not limited by this disclosure.

Finally, step 104 will be described.

In an exemplary embodiment, Step 104 may include:

Step 1041: Calculate the external common tangent point between every two adjacent circles based on every two adjacent second trajectory points and their corresponding line widths.

Herein, a circle takes a second trajectory point as its center and the trajectory line width corresponding to the second trajectory point as its diameter.

Step 1042: Draw the writing trajectory with the external common tangent point as the outer contour point of the writing trajectory.

Figure 3:
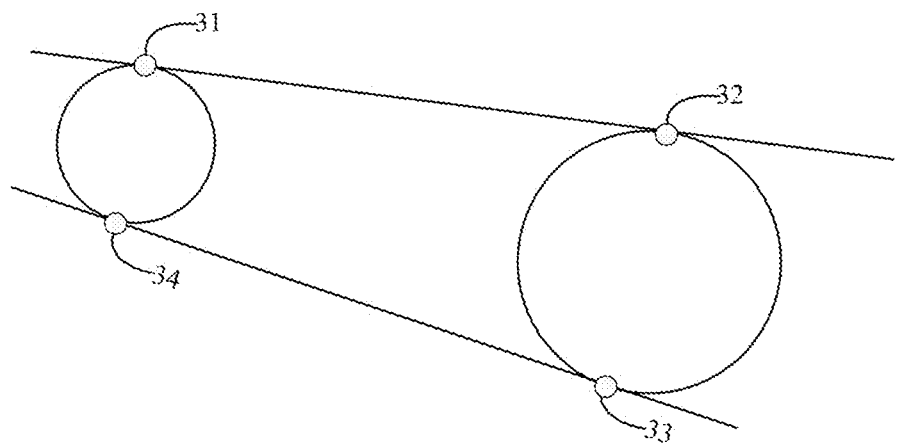
FIG. 3 is a schematic diagram of determining the external common tangent point of two circles according to an embodiment of the present disclosure.

For example, as shown in FIG. 3, according to the centers and diameters of two adjacent circles, the external common tangent points between two adjacent circles can be calculated and include: the first tangent point 31, the second tangent point 32, the third tangent point 33 and the fourth tangent point 34.

In the description, the obtained first trajectory point, the calculated second trajectory point and the common tangent point include the coordinate data of points.

Figure 4:
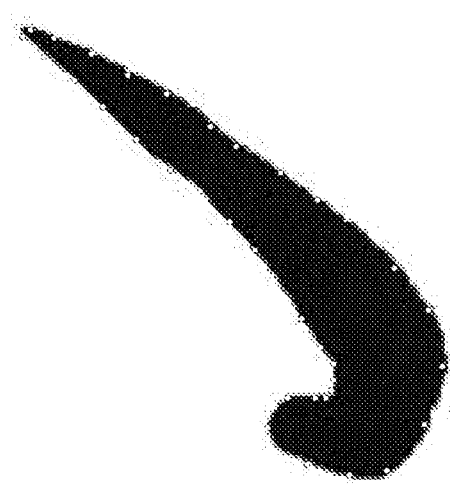
FIG. 4 is a schematic diagram of the display of a writing trajectory according to an embodiment of the present disclosure.

For example, taking as an example that the original writing trajectory is the last stroke of Chinese character "费", according to the external common tangent point corresponding to the original writing trajectory, the writing trajectory as shown in FIG. 4 can be drawn.

It can be seen from the above content that, in the writing trajectory processing method provided by the embodiments of the present disclosure, after the writing data of the original writing trajectory are obtained, wherein the writing data includes multiple first trajectory points and multiple first contact areas corresponding to the first trajectory points one to one; the writing data are smoothed to obtain smoothed writing data, wherein the smoothed writing data includes multiple second trajectory points and multiple second contact areas corresponding to the second trajectory points one to one; then multiple trajectory line widths corresponding to the multiple second trajectory points are determined based on the multiple second contact areas; and finally a writing trajectory is displayed based on the multiple second trajectory points and the multiple trajectory line widths. In this way, by smoothing the writing data to obtain smoothed trajectory points and contact areas, determining the trajectory line width according to the smoothed contact areas, and then displaying the writing trajectory through the multiple smoothed trajectory points and the trajectory line widths corresponding to the multiple smoothed trajectory points, the jagged and burr appearance of the writing trajectory can be eliminated, and the displayed writing trajectory can be smooth, full and natural, which improves the display effect of the writing trajectory and then improving users' writing experience. In an exemplary embodiment, when a user uses a stylus for writing calligraphy fonts (such as soft pen for calligraphy fonts) to write the original writing trajectory, the displayed writing trajectory is not only smooth, full and natural, but also has a beautiful pen-tip effect, which can further improve the user's writing experience and enable the user to obtain an enjoyable writing experience.

Figure 5:
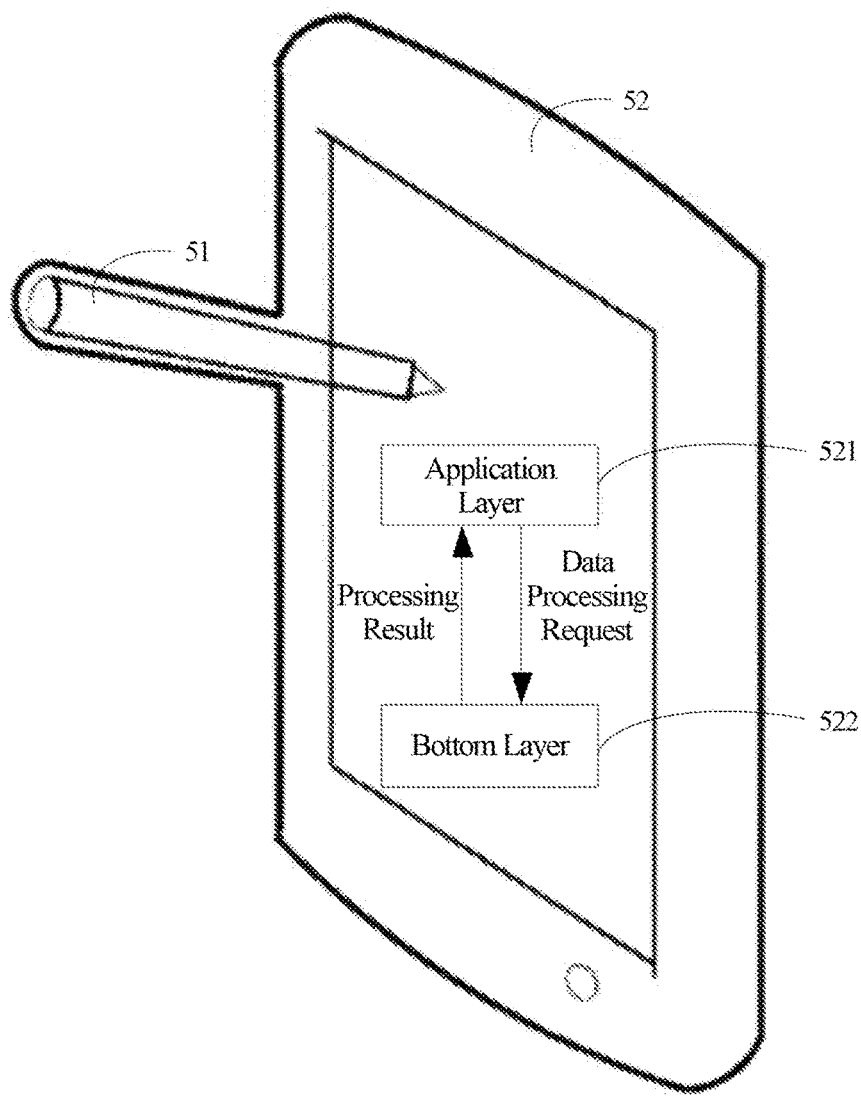
FIG. 5 is a schematic diagram of the structure of a writing system according to an embodiment of the present disclosure.

Embodiments of the present disclosure provide a writing system. FIG. 5 is a schematic diagram of the structure of a writing system according to an embodiment of the present disclosure, as shown in FIG. 5, the writing system may include a stylus 51 for writing calligraphy fonts and a touch control device 52 according to one or more embodiments described above.

In an exemplary embodiment, a touch control device may be an infrared touch control device.

In an exemplary embodiment, taking as an example that the original writing trajectory is a soft pen calligraphy font, the stylus used for writing calligraphy fonts may be a sponge pen.

In an exemplary embodiment, the operating system of the touch control device may be Android, as shown in FIG. 5, the touch control device 52 may include: an application layer 521 and a bottom layer 522, and the application layer 521 and the bottom layer 522 (such as an algorithm layer) of the touch control device cooperate to achieve a smooth, full and natural handwriting presentation. The application layer 521 is mainly used for transmitting the trajectory points and their corresponding contact areas to the bottom layer 522 for processing through data processing requests when obtaining the trajectory points and their corresponding contact areas of the writing trajectory input by the user, so that the bottom layer 522 can return the processing results to the application layer 521 after processing the trajectory points and their corresponding contact areas. The bottom layer 522 is mainly used for smoothing writing trajectory according to the trajectory points and their corresponding contact areas transmitted by the application layer 521, and beautifying the writing trajectory based on contact areas.

For example, the application layer can obtain the abscissa and ordinate of the first trajectory point in the original writing trajectory through the getX ( ) interface and getY ( ) interface in the touch event, and obtain the length of long axis and length of short axis of the pressed ellipse region through the getTouchMajor ( ) interface and getTouchMinor ( ) interface in the touch event. Then, according to the area formula of ellipse, the first contact area is calculated based on the length of long axis and length of short axis of the pressed ellipse area, so that the application layer obtains the writing data of the original writing trajectory. The writing data may include multiple first trajectory points and multiple first contact areas corresponding to the first trajectory points one to one. Next, the application layer can transmit the writing data of the original writing trajectory to the algorithm layer through the data processing request. In this way, the algorithm layer can smooth the written data through the Bezier curve to obtain the smoothed written data, wherein the smoothed writing data includes multiple second trajectory points and multiple second contact areas corresponding to the second trajectory points one to one. And the algorithm layer can determine multiple trajectory line widths corresponding to multiple second track points based on multiple second contact areas (e.g., the preset scaling coefficients include a preset first coefficient and a preset second coefficient, the second contact area is divided by the preset first coefficient for scaling processing, and then the processed second contact area is multiplied by the preset second coefficient for scaling processing to obtain the trajectory line widths of the trajectory point corresponding to the second contact area). Then, the algorithm layer can calculate the writing trajectory simulation model in real time according to multiple second trajectory points and multiple trajectory line widths corresponding to the second trajectory points one to one, that is, calculate the coordinate points of polygon connection between every two adjacent "circles" (that is, the external common tangent points between every two adjacent circles). Finally, the algorithm layer returns the calculated external common tangent point between every two adjacent circles (where any one circle takes a second trajectory point as its center and the trajectory line width corresponding to the second trajectory point as its diameter) to the application layer. Finally, according to the external common tangent point between every two adjacent circles, the application layer can display the handwriting with a smooth, natural and beautiful effect.

The above description of the embodiments of the system is similar to the above description of the embodiments of the method, and has the similar advantages. For the technical details not disclosed in the embodiments of the disclosed system, please refer to the description of the embodiments of the disclosed method, which will not be further described here.

Embodiments of the present disclosure further provides a touch control device, which includes a processor and a memory storing a computer program that can be run on the processor, wherein the steps of the writing trajectory processing method in one or more embodiments described above are implemented when the processor executes the program.

Figure 6:
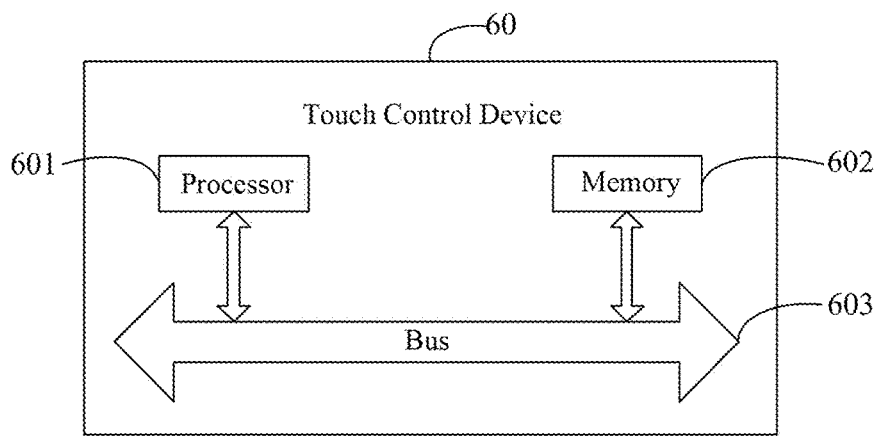
FIG. 6 is a schematic diagram of the structure of a touch control device according to an exemplary embodiment of the present disclosure.

In an exemplary embodiment, as shown in FIG. 6, the touch control device 60 may include at least one processor 601 and at least one memory 602 and bus 603 connected to the processor 601; wherein the processor 601 and the memory 602 communicate with each other through the bus 603. The processor 601 is used to call the program instructions in the memory 602 to execute the steps of the writing trajectory processing method in one or more embodiments described above.

In practice, the above-mentioned processor may be a central processing unit (CPU), other general-purpose processors, a digital signal processor (DSP), a field programmable gate array (FPGA) or other programmable logic devices, discrete gate or transistor logic devices, discrete hardware components, application specific integrated circuits, etc. The general-purpose processor may be a microprocessor (MPU) or any conventional processor.

The memory may include non-permanent memory, random access memory (RAM) and/or nonvolatile memory in computer readable storage media, such as read only memory (ROM) or flash RAM, and the memory includes at least one memory chip.

Besides a data bus, a bus may also include a power bus, a control bus and a status signal bus, etc. However, for clarity of illustration, various buses are denoted as the bus 603 in FIG. 6.

In an implementation process, the processing performed by the touch control device may be completed by an integrated logic circuit of hardware in the processor or instructions in the form of software. That is, the acts of the method in the embodiments of the present disclosure may be embodied as the execution of hardware processor, or the execution of a combination of hardware in the processor and software modules. The software modules may be located in a storage medium, such as a random access memory, a flash memory, a read-only memory, a programmable read-only memory, an electrically erasable programmable memory, or register. The storage medium is located in the memory, and the processor reads information in the memory and completes the acts of the foregoing methods in combination with hardware thereof. To avoid repetition, the detail will not be described here.

In a embodiments of the present disclosure further provide a computer readable storage medium, includes a stored program, and the touch control device where the storage medium is located is controlled to execute the above writing trajectory processing method in one or more of the aforementioned embodiments when the program is run.

In practice, the above computer readable storage medium can be, for example, ROM/RAM, magnetic disk, optical disk, etc.

The above description of the embodiments of the touch control device or computer readable storage medium is similar to the description of the above embodiments of the method, and has similar advantages. For the technical details not disclosed in the embodiments of the touch control device or computer readable storage medium of the present disclosure, please refer to the description of the embodiments of the disclosed method, which will not be further described here.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the description of embodiments of the present disclosure, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. Those of ordinary skill in the art can understand the specific meanings of the above mentioned terms in the present disclosure according to specific situations.

Those of ordinary skill in the art will understand that all or some of the acts, systems, and functional modules/units in the methods disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer readable media, which may include computer storage media (or non-transitory media), and communication media (or transitory media). As is well known to those of ordinary skill in the art, the term "computer storage media" includes volatile and nonvolatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other media that can be used to store desired information and can be accessed by a computer. Furthermore, it is well known to those of ordinary skill in the art that communication media typically contain computer readable instructions, data structures, program modules, or other data in a modulated data signal such as a carrier or other transmission mechanism, and may include any information delivery medium.

Although the embodiments disclosed in the present disclosure are as described above, the described contents are only the embodiments for facilitating understanding of the present disclosure, which are not intended to limit the present disclosure. Any person skilled in the art to which the present disclosure pertains may make any modifications and variations in the form and details of implementation without departing from the spirit and the scope of the present disclosure, but the patent protection scope of the present disclosure shall still be subject to the scope defined in the appended claims.

What is claimed is:

1. A writing trajectory processing method, comprising:
obtaining writing data of an original writing trajectory, wherein the writing data comprise a plurality of first trajectory points and a plurality of first contact areas corresponding to the plurality of first trajectory points one to one;
smoothing the writing data to obtain smoothed writing data; wherein the smoothed writing data comprise a plurality of second trajectory points and a plurality of second contact areas corresponding to the plurality of second trajectory points one to one;
determining a plurality of trajectory line widths corresponding to the plurality of second trajectory points one to one based on the plurality of second contact areas; and
displaying the writing trajectory based on the plurality of second trajectory points and the plurality of trajectory line widths,
wherein determining the plurality of trajectory line widths corresponding to the plurality of second trajectory points one to one based on the plurality of second contact areas, comprises:
scaling the plurality of second contact areas with a preset scaling factor to obtain the plurality of trajectory line widths, and wherein scaling the plurality of second contact areas with the preset scaling factor to obtain the plurality of trajectory line widths, comprises:
calculating to obtain the plurality of trajectory line widths with the following formula:

$$S_a' = k_2 * S_a / k_1$$

wherein, $S_a$ represents the second contact area, $S_a'$ represents the trajectory line width, the preset scaling coefficients comprise: a preset first coefficient and a preset second coefficient, $k_1$ represents the preset first coefficient and $k_2$ represents the preset second coefficient, wherein obtaining the writing data of the original writing trajectory, comprises:
during a process of inputting the original writing trajectory by a user, obtaining the plurality of first trajectory points through an interface for obtaining coordinates of touch events, and obtaining a plurality of parameters of touch elliptical regions corresponding to the plurality of first trajectory points one to one through an interface for obtaining the parameters of the touch elliptical regions of the touch events, wherein the parameters of each touch elliptical region comprises a length of a long axis and a short axis of the touch elliptical region; and
calculating the plurality of first contact areas based on the plurality of parameters of the touch elliptical regions, an area of each elliptical region is calculated by the following formula:

$$S = \pi a b / 4$$

wherein S is the area of each elliptical region, a is the length of the long axis, b is the length of the short axis and $\pi$ is a circular constant (Pi).

2. The writing trajectory processing method according to claim 1, wherein displaying the writing trajectory based on the plurality of second trajectory points and the plurality of trajectory line widths, comprises:
calculating an external common tangent point between every two adjacent circles based on every two adjacent second trajectory points and corresponding every two adjacent trajectory line widths; wherein any one circle takes a second trajectory point as a center and a trajectory line width corresponding to the second trajectory point as a diameter;
drawing the writing trajectory with the external common tangent point as an outer contour point of the writing trajectory.

3. The writing trajectory processing method according to claim 1, wherein the preset first coefficient is an integer greater than 0 and less than 1000.

4. The writing trajectory processing method according to claim 1, wherein the preset second coefficient is an integer greater than 0 and less than 10.

5. The writing trajectory processing method according to claim 1, wherein smoothing the writing data to obtain smoothed writing data comprises:
carrying out smooth processing through Bezier curves based on the plurality of first trajectory points to obtain the plurality of second trajectory points;
smoothing the plurality of first contact areas through the Bezier curve to obtain the plurality of second contact areas.

6. The writing trajectory processing method according to claim 5, wherein carrying out smooth processing through Bezier curves based on the plurality of first trajectory points to obtain the plurality of second trajectory points, comprises:

calculating a midpoint of every two adjacent first trajectory points;
smoothing a point sequence consisting of the plurality of first trajectory points and the midpoint of every two adjacent first trajectory points by the Bezier curve to obtain the plurality of second trajectory points.

7. The writing trajectory processing method according to claim 6, wherein smoothing the point sequence consisting of the plurality of first trajectory points and the midpoint of every two adjacent first trajectory points by the Bezier curve to obtain the plurality of second trajectory points, comprises:
taking a first one of the first trajectory points as a starting point parameter of the Bezier curve, a midpoint between the first one and a second one of the first trajectory points as a control point parameter of the Bezier, and the midpoint between the first one and the second one of the first trajectory points as an end point parameter of the Bezier curve, and calculating to obtain partial points in the second trajectory points by using a Bezier curve formula;
sequentially taking a midpoint of an i-th one of the first trajectory points and a (i+1)-th one of the first trajectory points as the starting point parameter of the Bezier curve, the (i+1)-th one of the first trajectory points as the control point parameter of the Bezier curve, and a midpoint of the (i+1)-th one of the first trajectory points and a (i+2)-th one of the first trajectory points as the end point parameter of the Bezier curve, and using the Bezier curve formula to calculate to obtain other points except the partial points in the second trajectory points, where i is a positive integer greater than or equal to 1;
the Bezier curve formula is: $B(t) = (1-t)^2 P_0 + 2t(1-t) P_1 + t^2 P_2$, wherein $B(t)$ represents a second trajectory point, $P_0$ represents the starting point parameter of the Bezier curve, $P_2$ represents the end point parameter of the Bezier curve, $P_1$ represents the control point parameter of the Bezier curve, and t is a variable, $t \in [0,1]$.

8. The writing trajectory processing method according to claim 1, wherein obtaining the writing data of the original writing trajectory, comprises:
obtaining the writing data in a process that a user inputs the original writing trajectory on a touch control device through a stylus for writing calligraphy fonts.

9. A touch control device, comprising a processor and a memory storing a computer program that is capable of being run on the processor, wherein the processor is configured to call and run the program stored in the memory to implement a writing trajectory processing method,
wherein the writing trajectory processing method comprises:
obtaining writing data of an original writing trajectory, wherein the writing data comprise a plurality of first trajectory points and a plurality of first contact areas corresponding to the plurality of first trajectory points one to one;
smoothing the writing data to obtain smoothed writing data; wherein the smoothed writing data comprise a plurality of second trajectory points and a plurality of second contact areas corresponding to the plurality of second trajectory points one to one;
determining a plurality of trajectory line widths corresponding to the plurality of second trajectory points one to one based on the plurality of second contact areas; and
displaying the writing trajectory based on the plurality of second trajectory points and the plurality of trajectory line widths, wherein determining the plurality of trajectory line widths corresponding to the plurality of second trajectory points one to one based on the plurality of second contact areas, comprises:

scaling the plurality of second contact areas with a preset scaling factor to obtain the plurality of trajectory line widths, and wherein scaling the plurality of second contact areas with the preset scaling factor to obtain the plurality of trajectory line widths, comprises:

calculating to obtain the plurality of trajectory line widths with the following formula:

$$S_a'=k_2*S_a/k_1$$

wherein, $S_a$ represents the second contact area, $S_a'$ represents the trajectory line width, the preset scaling coefficients comprise: a preset first coefficient and a preset second coefficient, $k_1$ represents the preset first coefficient and $k_2$ represents the preset second coefficient, wherein obtaining the writing data of the original writing trajectory, comprises:

during a process of inputting the original writing trajectory by a user, obtaining the plurality of first trajectory points through an interface for obtaining coordinates of touch events, and obtaining a plurality of parameters of touch elliptical regions corresponding to the plurality of first trajectory points one to one through an interface for obtaining the parameters of the touch elliptical regions of the touch events, wherein the parameters of each touch elliptical region comprises a length of a long axis and a short axis of the touch elliptical region; and calculating the plurality of first contact areas based on the plurality of parameters of the touch elliptical regions, an area of each elliptical region is calculated by the following formula:

$$S=\pi ab/4$$

wherein S is the area of each elliptical region, a is the length of the long axis, b is the length of the short axis and $\pi$ is a circular constant (Pi).

10. A writing system comprising: a stylus for writing calligraphy fonts and the touch control device according to claim 9.

11. A non-transitory computer readable storage medium, which comprises a stored program, wherein when the program is executed, a touch control device where the storage medium is located is controlled to execute a writing trajectory processing method, wherein the writing trajectory processing method comprises:

obtaining writing data of an original writing trajectory, wherein the writing data comprise a plurality of first trajectory points and a plurality of first contact areas corresponding to the plurality of first trajectory points one to one;

smoothing the writing data to obtain smoothed writing data; wherein the smoothed writing data comprise a plurality of second trajectory points and a plurality of second contact areas corresponding to the plurality of second trajectory points one to one;

determining a plurality of trajectory line widths corresponding to the plurality of second trajectory points one to one based on the plurality of second contact areas; and displaying the writing trajectory based on the plurality of second trajectory points and the plurality of trajectory line widths, wherein determining the plurality of trajectory line widths corresponding to the plurality of second trajectory points one to one based on the plurality of second contact areas, comprises:

scaling the plurality of second contact areas with a preset scaling factor to obtain the plurality of trajectory line widths, and wherein scaling the plurality of second contact areas with the preset scaling factor to obtain the plurality of trajectory line widths, comprises:

calculating to obtain the plurality of trajectory line widths with the following formula:

$$S_a'=k_2*S_a/k_1$$

wherein, $S_a$ represents the second contact area, $S_a'$ represents the trajectory line width, the preset scaling coefficients comprise: a preset first coefficient and a preset second coefficient, $k_1$ represents the preset first coefficient and $k_2$ represents the preset second coefficient, wherein obtaining the writing data of the original writing trajectory, comprises:

during a process of inputting the original writing trajectory by a user, obtaining the plurality of first trajectory points through an interface for obtaining coordinates of touch events, and obtaining a plurality of parameters of touch elliptical regions corresponding to the plurality of first trajectory points one to one through an interface for obtaining the parameters of the touch elliptical regions of the touch events, wherein the parameters of each touch elliptical region comprises a length of a long axis and a short axis of the touch elliptical region; and calculating the plurality of first contact areas based on the plurality of parameters of the touch elliptical regions, an area of each elliptical region is calculated by the following formula:

$$S=\pi ab/4$$

wherein S is the area of each elliptical region, a is the length of the long axis, b is the length of the short axis and $\pi$ is a circular constant (Pi).

* * * * *